United States Patent
Hosogaya et al.

Patent Number: 5,643,363
Date of Patent: Jul. 1, 1997

[54] EXTRUSION TYPE COATING HEAD

[75] Inventors: Ryuji Hosogaya, Saku; Eizo Tsunoda, Komoro; Akira Hatakeyama, Saku; Yoshihisa Osawa, Miyota-machi; Hideki Tanaka, Saku; Seiichi Tobisawa, Hino, all of Japan

[73] Assignees: TDK Corporation; Konica Corporation, both of Tokyo, Japan

[21] Appl. No.: 408,567

[22] Filed: Mar. 22, 1995

[30] Foreign Application Priority Data

Mar. 25, 1994 [JP] Japan .................................. 6-077773

[51] Int. Cl.$^6$ ...................................................... B05C 3/12
[52] U.S. Cl. ............................................. 118/410; 118/419
[58] Field of Search ............................... 118/410, 419; 425/461, 462, 113

[56] References Cited

U.S. PATENT DOCUMENTS

| | | |
|---|---|---|
| 5,173,119 | 12/1992 | Watanabe et al. . |
| 5,336,322 | 8/1994 | Tobisawa et al. ................. 118/410 |
| 5,397,600 | 3/1995 | Shibata et al. ................... 118/410 |

FOREIGN PATENT DOCUMENTS

| | | |
|---|---|---|
| 49-1459 | 1/1974 | Japan . |
| 55-35990 | 9/1980 | Japan . |
| 7108207 | 4/1995 | Japan . |
| 1 522 543 | 8/1978 | United Kingdom . |

OTHER PUBLICATIONS

Patent Abstracts, vol. 17, No. 670 (C–1139), Dec. 9, 1993, JP–5–220438, Aug. 31, 1993.

Patent Abstracts of Japan, No. 2 (C–775), JP–2–207865, Aug. 17, 1990.

Patent Abstracts of Japan, No. 2 (C–775), JP–2–207866, Aug. 17, 1990.

Primary Examiner—Brenda A. Lamb
Attorney, Agent, or Firm—Oblon, Spivak, McClelland, Maier & Neustadt, P.C.

[57] ABSTRACT

The center line average roughness (Ra) of the slit inner surfaces is made in a predetermined range of 5.0 μm according to the present invention, and the straightness (W1) in the delivery direction of the coating solution thereof and the straightness (W2) in the perpendicular direction to the delivery direction thereof are made in predetermined ranges respectively in preferred embodiments. Thereby, development of wrinkles and inclined elongation in the tape itself are prevented when wound on a roll, the productivity is increased, and the product quality is improved.

5 Claims, 5 Drawing Sheets

EXTRUSION TYPE COATING HEAD

BACKGROUND OF THE INVENTION

1. Field of the Invention

The present invention relates to an extrusion type coating head that is used for applying, for example, magnetic coating onto a support.

2. Description of the Prior Art

Conventionally, when a magnetic recording medium is produced by applying a coating solution such as a magnetic paint on a non-magnetic support, for example, various coating methods have been adopted such as gravure, reverse, extrusion, and doctor blade coating methods.

Among them, the extrusion type coating method is in particular characteristic in that a very uniform thin film is obtained even if the film thickness in wet condition is 10 μm or less, and suitable for a precise thin film coating. Thus, the extrusion type coating method has been noted for a very suitable coating method as a production process of a magnetic recording medium that requires a thin film coating for the purpose of high density recording. Therefore, extrusion type coating heads used in this coating method have been proposed heretofore.

In particular, in the Japanese Patent Laid-open Publication Nos. HEI 2-207865 and HEI 2-207866, and Japanese Patent Publication Nos. SHO 55-35990 and SHO 49-1459 proposed are coating methods and/or coating devices that prevent coating defects such as streak development and unevenness on coating surfaces.

In the Japanese Patent Laid-open Publication Nos. HEI 2-207865 and HEI 2-207866, proposed is a coating device in which a coating solution is delivered from a nozzle to apply the solution to the support to be coated; in such a device, the center line average roughness of the back edge surface is controlled, or the straightness of the waviness component of the front and/or back edge surface is controlled for preventing generation of streaky coating unevenness and other streaky coating defects.

While the coating thickness becomes uniform in the longitudinal direction in the coating of the base film by these devices, however, the coating thickness in the direction of width tends to be uneven; in addition, wrinkles and inclined elongation often develop in the tape itself when wound on a roll since the coating thickness varies. This not only reduces the productivity (yield) substantially but also deteriorates the product quality, particularly causing the fluctuation of output level and decrease of skew; thus, further improvement of the coating quality is desired.

Japanese Patent Publication No. SHO 55-35990 disclosed a cascade type coating device having a gap for supplying the coating solution, and Japanese Patent Publication No. SHO 55-35990 disclosed a tubular type coating device, in particular one having a slit opening of a special shape; both of these were proposed for the purpose of obtaining uniform coating thickness.

However, these devices do not give satisfatory coating quality such as uniform coating thickness, as are the cases mentioned above. Further improvement is required particularly for overcoming uneven coating and getting better uniformity in the film thickness of the width direction.

The present invention has been made under such situation and aims to improve coating surface quality, in particular to improve unevenness and unsteadiness in the film thickness of the width direction, thereby preventing development of wrinkles and inclined elongation in the tape itself when wound on a roll, improving the productivity, and reducing adverse effects (for example, fluctuation of output level and decrease of skew) to the product quality.

SUMMARY OF THE INVENTION

For attaining these objects, the present inventors have ardently studied by noting the value of center line average roughness (Ra) in the inner surfaces of the slit of an extrusion type coating head, the value of straightness (W1) in the delivery direction of a coating solution in the inner surfaces of the slit and the value of straightness (W2) in the perpendicular direction to the delivery direction. As a result, the present inventors have found that these values significantly contribute to improve the coating quality and have completed the present invention.

The present invention relates to an extrusion type coating head for applying a coating solution onto a support, provided with a pocket storing the coating solution fed in the coating head temporarily for extruding the solution uniformly and a slit that is connected to the pocket and serves as a delivery port for extruding the coating solution, wherein each of the inner surfaces of the slit is made to have a center line average roughness (Ra) of 5.0 μm or less.

Each inner surface of the slit according to a preferred embodiment of the present invention is made to have a center line average roughness (Ra) of 3.0 μm or less.

Each inner surface of the slit according to another preferred embodiment of the present invention is made to have a straightness (W1) of 5 μm/10 mm or less in the delivery direction of the coating solution and a straightness (W2) of 50 μm/m or less in the perpendicular direction to the delivery direction.

Each inner surface of the slit according to still another preferred embodiment of the present invention is made to have a straightness (W1) of 5 μm/10 mm or less in the delivery direction of the coating solution and a straightness (W2) of 30 μm/m or less in the perpendicular direction to the delivery direction.

According to the present invention of such composition, a coating solution fed from a supply means such as a pump for the solution is stored, when reaching the extrusion type coating head, in the pocket inside the head, passes through the slit (gap) portion that communicates to the pocket, and extruded to outside the head. The extruded coating solution is coated on a support. Since the center line average roughness (Ra) of the slit inner surfaces is made in a predetermined range and preferably the straightness (W1) in the delivery direction of the coating solution thereof and the straightness (W2) in the perpendicular direction to the delivery direction thereof are made in predetermined ranges respectively according to the present invention, the quality of the coating surface is improved, in particular, unevenness and unsteadiness in the film thickness of the width direction are improved.

DETAILED DESCRIPTION OF THE PREFERRED EMBODIMENTS

Now, embodiments of the present invention are explained in details referring to FIGS. 1 through 8.

At first, an embodiment of the extrusion type coating head according to the present invention is explained for a case of a so-called monolayer extrusion type coating head, a simplest shape (FIGS. 1 through 4).

Figure 1:
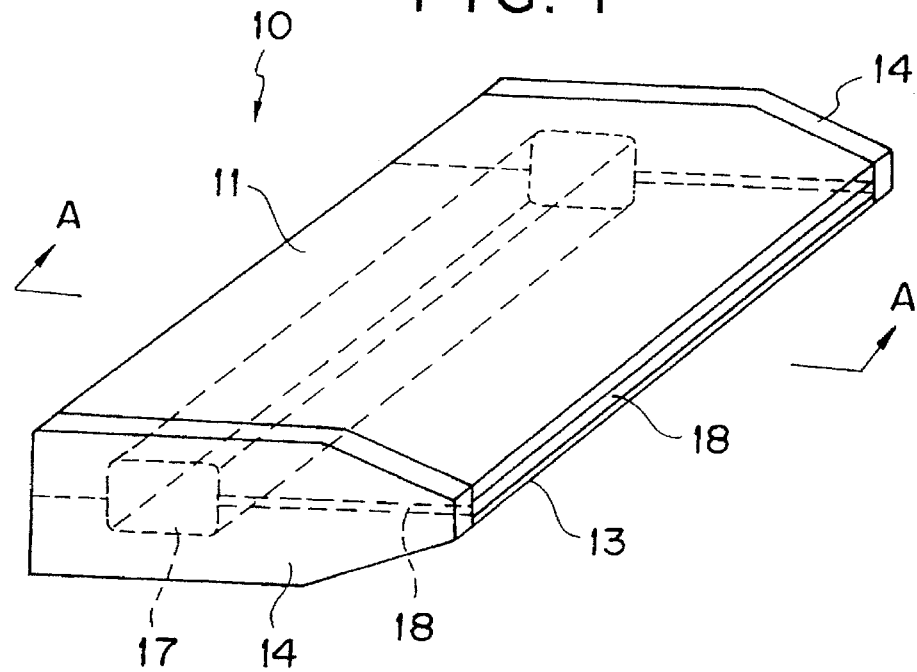
FIG. 1 is a perspective view of a coating head for monolayer extrusion according to the present invention.
Figure 2:
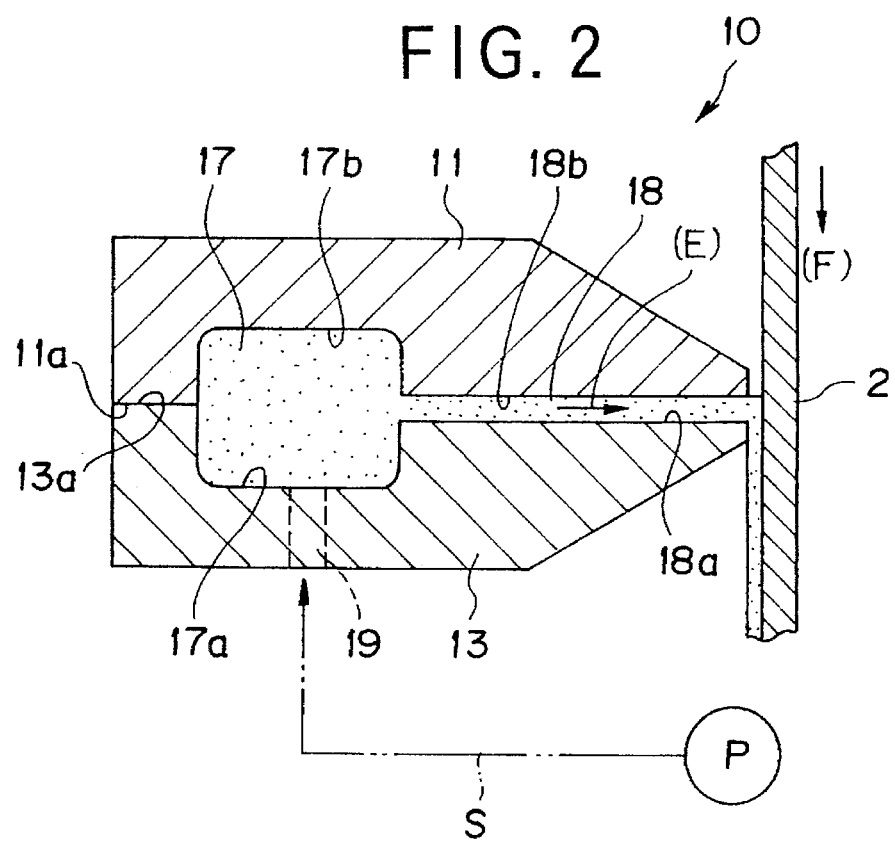
FIG. 2 is a cross section view taken along the line A—A of FIG. 1 illustrating the process of coating specifically.
Figure 3:
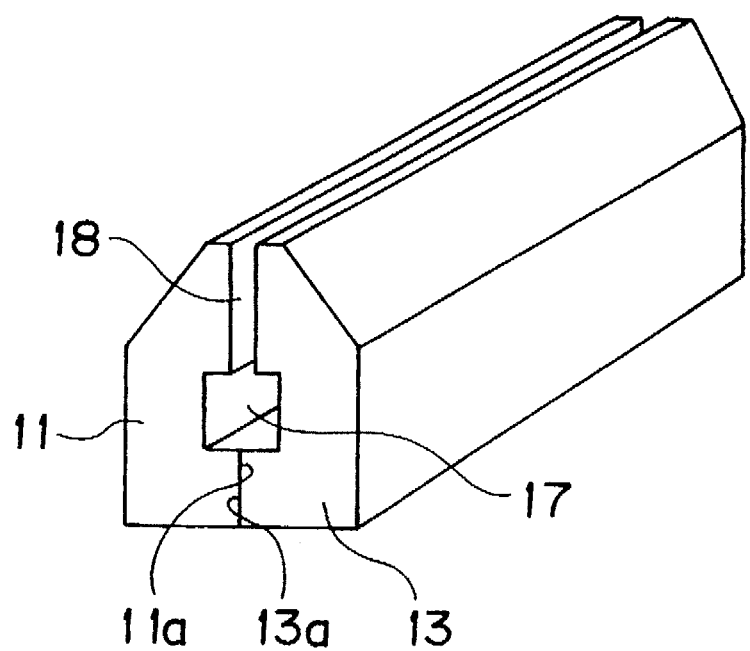
FIG. 3 is a perspective view when side plates 14, 14 are removed from FIG. 1.
Figure 4:
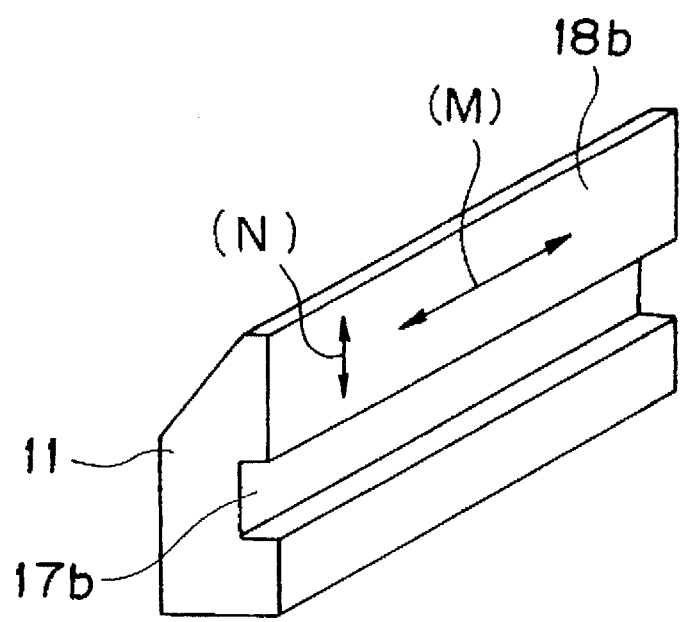
FIG. 4 is a perspective view showing the inner surface of front edge 11 emphasizing the slit inner surface in particular.

FIG. 1 is a perspective view of a coating head for monolayer extrusion. As shown in FIG. 1, the coating head for monolayer extrusion 10 is formed by combining a front edge 11 and a back edge 13 and thereafter sealing both sides of the front edge 11 and the back edge 13 with side plates 14, 14. FIG. 2 is a cross section view taken along the line A—A of FIG. 1 illustrating a process of coating specifically. FIG. 3 is a perspective view when the side plates 14, 14 are removed from FIG. 1, showing only the combination of the front edge 11 and the back edge 13. FIG. 4 is a perspective view showing an inner surface of the front edge 11 emphasizing a slit inner surface in particular.

As shown in FIGS. 2 and 3, the back edge 13 has, from one end to the other end of the coating head in the direction of width, a joint surface 13a that faces the front edge 11, a concave part 17a for forming the pocket 17 that stores a solution, and a slit surface 18a that is normally worked by grinding for forming the slit 18.

On the other hand, the front edge 11 has similarly, from one end to the other end of the coating head in the direction of width, a joint surface 11a that faces the back edge 13, a concave part 17b for forming the pocket 17 that stores the solution, and a slit surface 18b that is normally worked by grinding for forming the slit 18.

By jointly combining the surface 11a of the front edge 11 with the joint surface 13a of the back edge 13, the pocket 17 and the spit 18 are formed.

The pocket 17 is connected to an outside feed line S for the coating solution through a connection port 19 as shown in FIG. 2. The coating solution sent by a supply means such as a pump P is introduced into the pocket 17 through the feed line S. The coating solution introduced into the pocket 17 is pushed out through the slit 18 like arrow (E) (FIG. 2). The solution pushed out is coated on to one surface of a support 2 that is conveyed in the direction of arrow (F).

The coating head 10 for applying the coating solution onto the support 2 according to the present invention is provided with the pocket 17 that stores the coating solution temporarily for uniform extrusion of the coating solution supplied into the extrusion type coating head and provided with the slit 18 that is connected to pocket 17 and serves as the extrusion port of the coating solution. According to the present invention, the inner surfaces of the slit 18 mean substantially opposed slit surfaces 18a, 18b as shown in FIG. 2., and each of the inner surfaces of the slit 18 (slit surfaces 18a, 18b) is so set as having the center line average roughness (Ra) of 5.0 µm or less, preferably 3.0 µm or less.

When this value exceeds 5.0 µm, satisfactory product characteristics cannot be obtained because of the poor coating surface quality, especially severe unevenness of the coated surface. The lower limit value of the center line average roughness (Ra) is not to be specified; the value endlessly reaching zero is preferable although economic aspect should be considered. Sophisticated technology today for fabrication makes it possible to set a lower limit, for example, to Ra=0.03 µm.

The center line average roughness (Ra) defined herein is the value measured in accordance with JIS B 0601 (1982). That is, a part of the unit length l is taken from a roughness curve; the center line of the part taken away is set to X-AXIS and the direction of longitudinal magnification is set to Y-AXIS; and when the roughness curve is represented by y=f (x), the value calculated by the following equation in terms of micrometer (µm) is the center line average roughness (Ra).

$$Ra = \frac{1}{l} \int_o^l |f(x)| dx$$

In the present invention, it is preferable to control the straightness of the inner surfaces (18a, 18b) of slit 18 in addition to controlling the center line average roughness (Re) of the inner surfaces (18a, 18b) of the slit 18. That is, the straightness (W1) in the delivery direction of the coating solution in the inner surface 18b of the slit 18 (the direction of arrow (N) in FIG. 4) is to be controlled as 5 µm/10 mm or less. In addition, the straightness (W2) in the perpendicular direction to the delivery direction in the inner surface 18b of slit 18 (the direction (of width) of arrow (M) in FIG. 4) is to be controlled as 50 µm/m or less, preferably 30 µm/m or less.

When the value of straightness (W1) exceeds 5 µm/10 mm and the value of straightness (W2) exceeds 50 µm/m, the fluctuation of film thickness in the width direction becomes large. Thereby, when the support (tape) is wound into a roll after the coating, wrinkles and inclined elongation develop in the tape and the product yield decreases substantially.

The values (W1, W2) of straightness herein are represented by the maximum waviness measured in accordance with JIS B 0610 (1987). That is, an part (hereinafter referred to as sample part) of unit length is taken from a filtered wave waviness curve or from a rolling circle waviness curve; two straight lines which are parallel to the average line of the sample part are allowed to insert the sample part; the distance between the two straight lines is measured in the direction of longitudinal magnification of the filtered wave waviness curve or the rolling circle waviness curve; and the value of distance represented by micrometer unit (µm) is the value of straightness.

Figure 5:
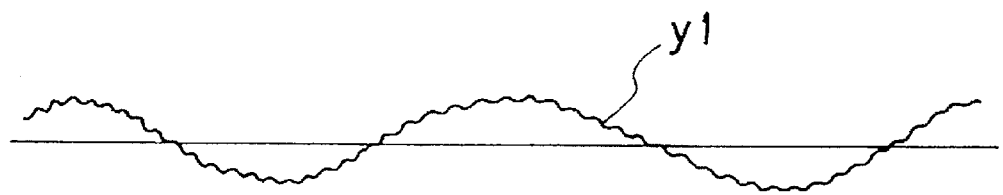
FIG. 5 is a diagram explaining the straightness.
Figure 6:
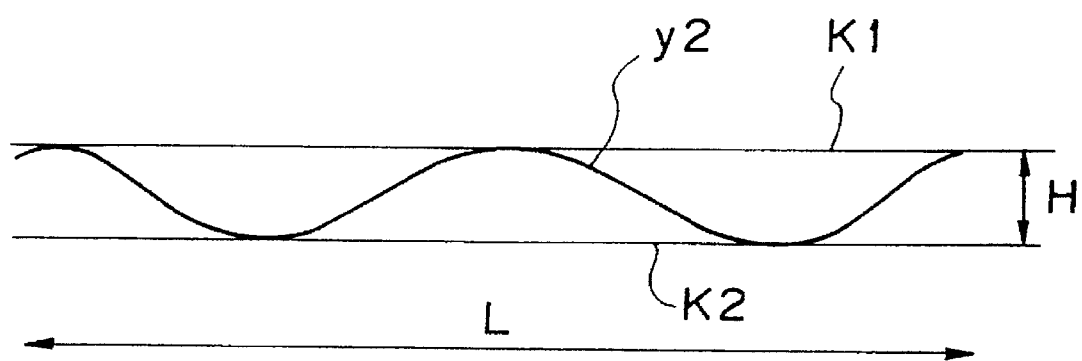
FIG. 6 is a diagram explaining the straightness.

This measuring method is explained more specifically referring to FIGS. 5 and 6. FIG. 5 shows a cross section curve schematically of the inner surface of slit 18, for example, in the direction of delivery. The cross section curve is obtained by a tracer method. The cross section curve y1 consists of the waviness component (low frequency component) and more fine component (high frequency component); when only the waviness component (low frequency component) is extracted and the more fine component (high frequency component) is neglected, the waviness curve y2 as shown in FIG. 6 is obtained. This waviness curve y2 is obtained against the unit length L; ideal straight lines K1 and K2 are drawn which are parallel each other and contact to waviness curve y2; and the distance H between K1 and K2 is the maximum waviness (straightness W1, W2). In the present invention, as for the maximum waviness (straightness W1) in the direction of delivery, the unit length is set as L=10 mm, and as for the maximum waviness (straightness W2) in the perpendicular direction to the delivery direction, the unit length is set as L=1 m.

The straightness required in the present invention is brought by grinding the slit surface using, for example, a surface grinding machine.

Figure 7:
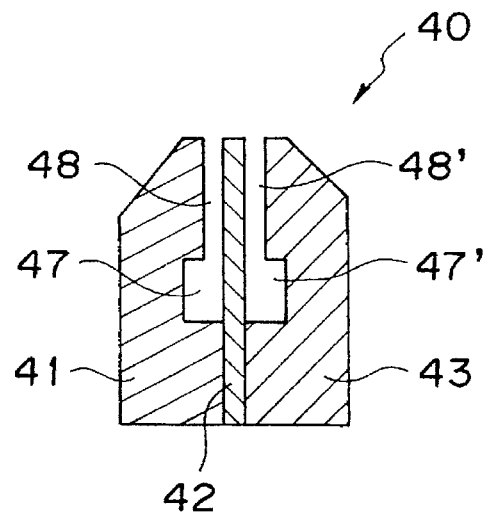
FIG. 7 is a perspective view of a two-layers extrusion type coating head.

While a case of so-called a monolayer extrusion type coating head, a simplest shape, is explained above as an embodiment of the extrusion type coating head according to the present invention, the present invention is also applicable to a multilayer extrusion type coating head having a plurality of slits and pockets as shown in FIG. 7 (FIG. 7 shows an example case of two-layers). Now, a simple explanation follows.

A two-layers extrusion type coating head 40 shown in FIG. 7 is composed of a front edge 41, a center edge 42, and a back edge 43. These three blocks are combined to form pockets 47, 47' and slits 48, 48'.

The values of center line average roughness (Ra) of the inner surfaces of the slits 48, 48' is made within the predetermined value according to the present invention as mentioned above. The straightness for the slits 48, 48' (W1, W2) is preferably made within the predetermined value mentioned above.

Examples of coating solutions that can be used for the extrusion type coating head of the present invention include a magnetic paint, which is used in the production of a magnetic recording medium. The magnetic paint may contain magnetic powders, binders, and solvents. Examples of magnetic powders include fine powders of oxides such as $\gamma$-$Fe_2O_3$, Co-containing $\gamma$-$Fe_2O_3$, $Fe_3O_4$, Co-containing $Fe_3O_4$, $CrO_2$, barium ferrite, and strontium ferrite; metals such as Fe, Co, and Ni, and their alloys; and iron carbide. As for the binder, any known resin binders may be used. There is no particular limitation to the solvent, which may be suitably selected, depending on the application, from ketones such as cyclohexanone and methylethylketone; and aromatics such as toluene. Magnetic coatings may also contain additives such as inorganic fine particles and lubricants as required.

A preferred magnetic recording layer formed by the magnetic paint mentioned above has a thickness in dryness of 0.1 to 6 µm and has a composition in which the magnetic powder occupies 30% to 90% by weight of the magnetic recording layer. The coating layer may be made into multilayers by coating the many coating solutions in wet condition. In this case, the coating solution is not limited to a magnetic paint or solution, any coating solution as mentioned above which is suitable for coating with an extrusion type coating head is applicable including a non-magnetic solution and a solution containing dissolved resin, and the layer composition of the coating solution may be selected as desired.

Examples of the support on which the coating solution is applied, include plastic films such as polyethyleneterephthalate film, long flexible supports comprising paper and metal foil, and are not limited specifically. The support may comprise layers that are subjected to pretreatment in various ways. An example of a series of coating processes of applying a coating solution on a support and winding is explained by referring to FIG. 8. The coating solution extruded from the extrusion type coating head 10 is applied at first to the support 2 that is drawn out from feed roll 30. The support applied by the coating solution is introduced into a dryer 31 where the coating solution is allowed to dry, and thereafter is wound by a winding roll 32. In the case where a magnetic paint is used as the coating solution, steps for a magnetic orientation and a calendering are properly installed at predetermined positions.

Now specific examples according to the present invention are given for explaining the present invention in further details.

EXAMPLE 1

Experiments for studying the effects of the center line average roughness (Ra) of the inner surfaces 18a, 18b of slit 18 of the extrusion type coating head 10 on unevenness of the coating, were made.

At first, a magnetic paint 1 of the following composition was prepared.

Magnetic Paint 1

| | Parts by weight |
| --- | --- |
| Co-containing $\gamma$-$Fe_2O_3$ | 100 |
| (Hc: 750 Oe, BET value: 43 $m^2$/g) | |
| Alumina powder | 5 |
| Vinylchrolide-vinylacetate-vinylalcohol co-polymer | 10 |
| Polymerization degree = 310, | |
| composition rate = 88:6:6) | |
| Polyester polyurethane resin | 10 |
| Carbon black | 5 |
| Stearic acid | 2 |
| Butylstearate | 1 |
| Methylethylketone | 100 |
| Toluene | 100 |
| Cyclohexanone | 80 |

The materials in the above composition were mixed and kneaded, dispersed, and filtered; and 4 parts by weight of polyisocyanate were added therewith to make a coating solution.

Figure 8:
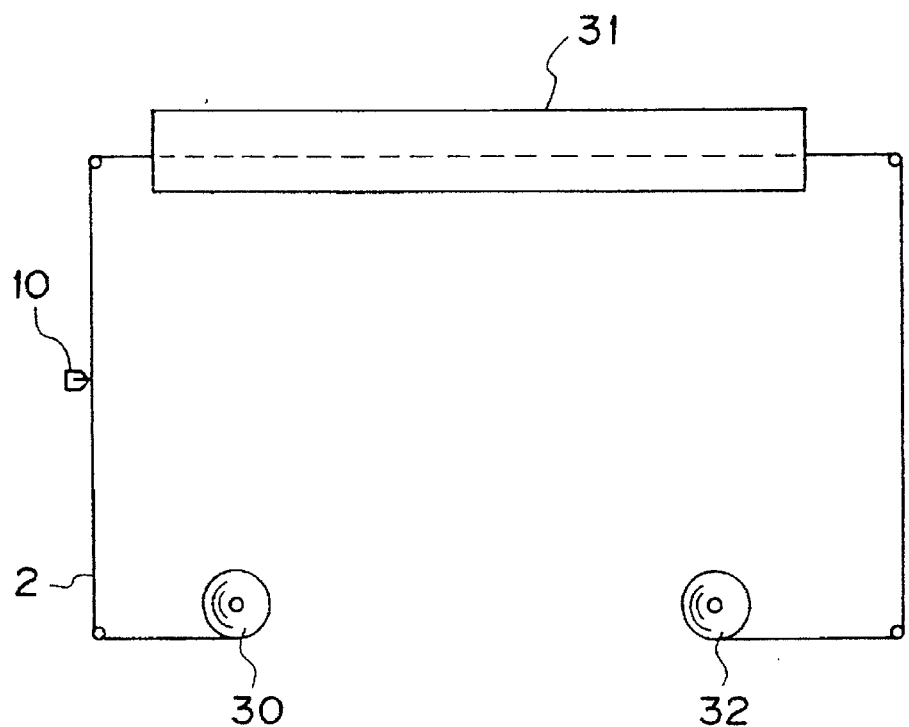
FIG. 8 is a schematic drawing showing an example of a series of coating processes of applying a coating solution on a non-magnetic support and winding.

Next, the monolayer extrusion coating head 10 as shown in FIG. 1, was prepared which comprised two blocks (the front edge 11 and the back edge 13) and two side plates 14, 14 blocking the ends of these blocks. The above-mentioned coating solution was fed by use of pump P (FIG. 2) into the coating head 10 and allowed to coat continuously on to a polyethyleneterephthalate support film that is continuously drawn off as shown in FIG. 8.

The coating unevenness was evaluated against each produced first roll, by the following procedure and criterion.

Coating Unevenness

The coating condition was visually observed for the coating length of 10,000 m and the coating width of 1,000 mm by using a transmitted light and a reflected light. The judgment criterion was as follows.

⊚: Excellent surface without unevenness

○: Some unevenness, but producible

X: Not producible

Five kinds of coating heads 10 for monolayer extrusion were used in the experiments. Each of the center line average roughness (Ra) of the inner surfaces of slit 18 was 1.0 µm, 3.0 µm, 5.0 µm, 7.0 µm, and 10.0 µm, respectively as shown in Table 1 below. Five points in the width direction were measured for the center line average roughness by using Surftest 301A (manufactured by Mitsutoyo Corporation) and the average value was adopted.

The results are shown in Table 1.

TABLE 1

| Extrusion type coating head No. | Center line average roughness (Ra) of slit inner surface | Coating unevenness |
| --- | --- | --- |
| No. I-1 | 1.0 μm | ⊚ |
| No. I-2 | 3.0 μm | ⊚ |
| No. I-3 | 5.0 μm | ◯ |
| No. I-4 | 7.0 μm | X |
| No. I-5 | 10.0 μm | X |

EXAMPLE 2

Experiments for studying the effects of the straightness (W1, W2) of a monolayer extrusion coating head 10 on fluctuation of the coating thickness, were made.

Magnetic tape rolls were prepared in the same manner as in Example 1 by using many kinds of monolayer extrusion coating heads having the inner surface of the slit of varied straightness (W1) in the delivery direction of the coating solution and of straightness (W2) in the perpendicular direction (the direction of width) to the delivery direction as shown in Table 2 below. All these heads have a same Ra of 3 μm in the inner surfaces. The straightness was measured by using a straightness tester PC-Nanoway (manufactured by Kyocera Corporation). The products magnetic tape rolls were evaluated by the following procedure and criterion. The coating thickness was set to 2.8 μm.

Coating Thickness Fluctuation

The fluctuation of coating thickness in the direction of width for 1,000 mm was measured by a X-ray coating thickness tester 3710A manufactured by Rigaku Corporation, and the maximum value of coating thickness fluctuation was adopted as the value of coating thickness fluctuation. The judgment criterion was as follows.

⊚: Less than 0.2 μm of coating thickness fluctuation in the direction of width

◯: 0.2 μm or more and less than 0.4 μm of coating thickness fluctuation in the direction of width X: 0.4 μm or more of coating thickness fluctuation in the direction of width The results are shown in Table 2.

TABLE 2

| Extrusion type coating head No. | Straightness in the direction of delivery (W1) | Straightness in the direction of width (W1) | Coating thickness fluctuation |
| --- | --- | --- | --- |
| No. II-1 | 2 μm/10 mm | 10 μm/m | ⊚ |
| No. II-2 | 5 μm/10 mm | 20 μm/m | ⊚ |
| No. II-3 | 5 μm/10 mm | 30 μm/m | ⊚ |
| No. II-4 | 5 μm/10 mm | 50 μm/m | ◯ |
| No. II-5 | 7 μm/10 mm | 50 μm/m | X |
| No. II-6 | 10 μm/10 mm | 50 μm/m | X |
| No. II-7 | 10 μm/10 mm | 70 μm/m | X |
| No. II-8 | 2 μm/10 mm | 70 μm/m | X |

Experimental results shown above, clearly demonstrate the effects of the present invention.

Since each center line average roughness (Ra) of the slit inner surfaces is made in a predetermined range, and preferably the straightness (W1) in the delivery direction of the coating solution thereof and the straightness (W2) in the perpendicular direction to the delivery direction thereof are made in predetermined ranges respectively according to the present invention, the quality of the coating surface is improved, in particular, unevenness and unsteadiness in the film thickness of the width direction are improved; thereby, development of wrinkles and inclined elongation in the tape itself are prevented when wound on a roll, the productivity is increased, and the product quality is improved.

What is claimed is:

1. An extrusion coating head for applying a coating solution onto a support comprising, a pocket storing the coating solution fed in the coating head temporarily for extruding the coating solution uniformly, and a slit being connected to the pocket and serving as a delivery port for extruding the coating solution, said slit comprising inner surfaces having a center line average roughness (Ra) of 5.0 μm or less, wherein the slit serves to permit the flow of the coating solution from said pocket along a delivery direction, each surface of the slit has a straightness (W1) in the delivery direction of the coating solution of 5 μm/10 mm or less and has a straightness (W2) in the perpendicular direction to the delivery direction of 50 μm/m or less.

2. An extrusion type coating head according to claim 1, wherein each surface of the slit has a straightness (W2) in the perpendicular direction to the delivery direction of 30 μm/m or less.

3. An extrusion coating head according to claim 1, wherein the coating solution is a magnetic paint containing a magnetic powder and a binder.

4. An extrusion coating head according to claim 1, wherein a center line average roughness (Ra) of the inner surfaces of said slit is 3.0 μm or less.

5. An extrusion coating head according to claim 4, wherein each surface of the slit has a straightness (W2) in the perpendicular direction to the delivery direction of 30 μm/m or less.

* * * * *